No. 723,975. PATENTED MAR. 31, 1903.
A. A. BALL, Jr.
STEERING MECHANISM FOR VEHICLES.
APPLICATION FILED JAN. 24, 1902.
NO MODEL. 4 SHEETS—SHEET 1.
Witnesses:
Rob't C. Chapman
Alex H. Macdonald
Inventor,
Augustus A. Ball Jr.
BY Albert H. Davis
Att'y.

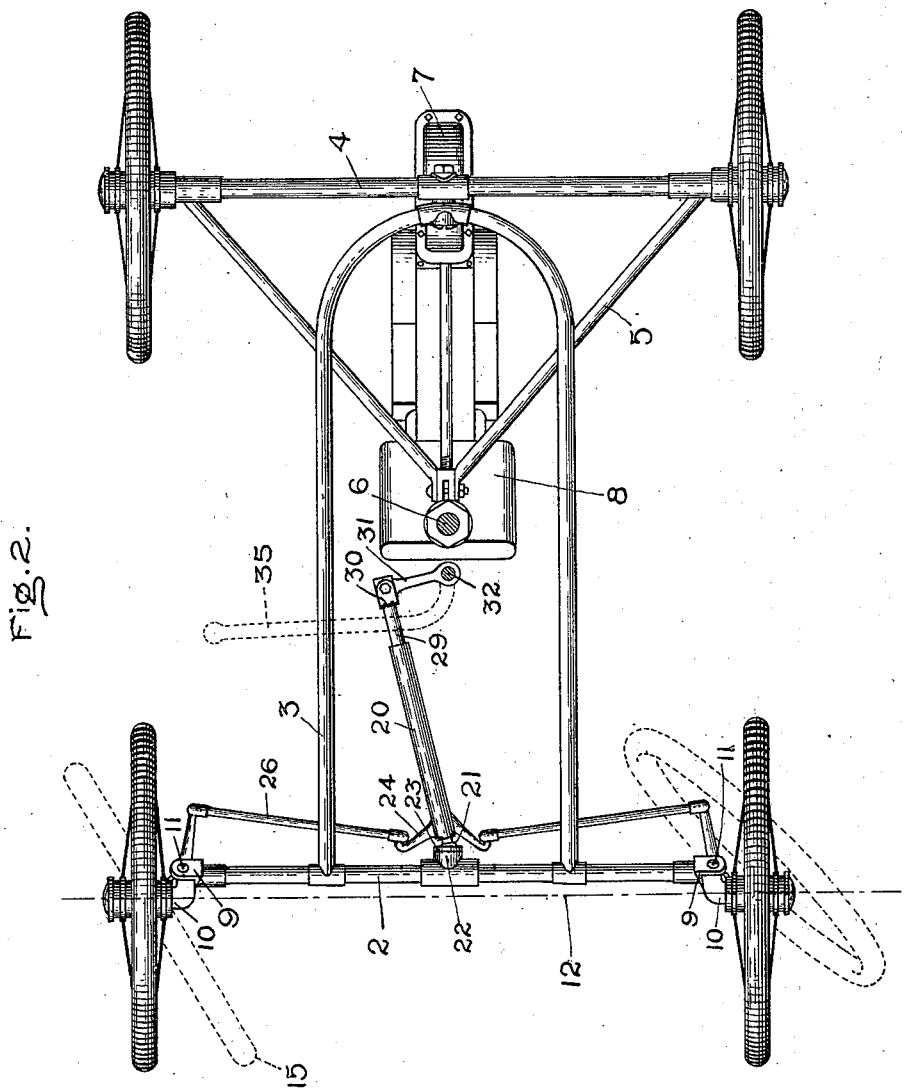

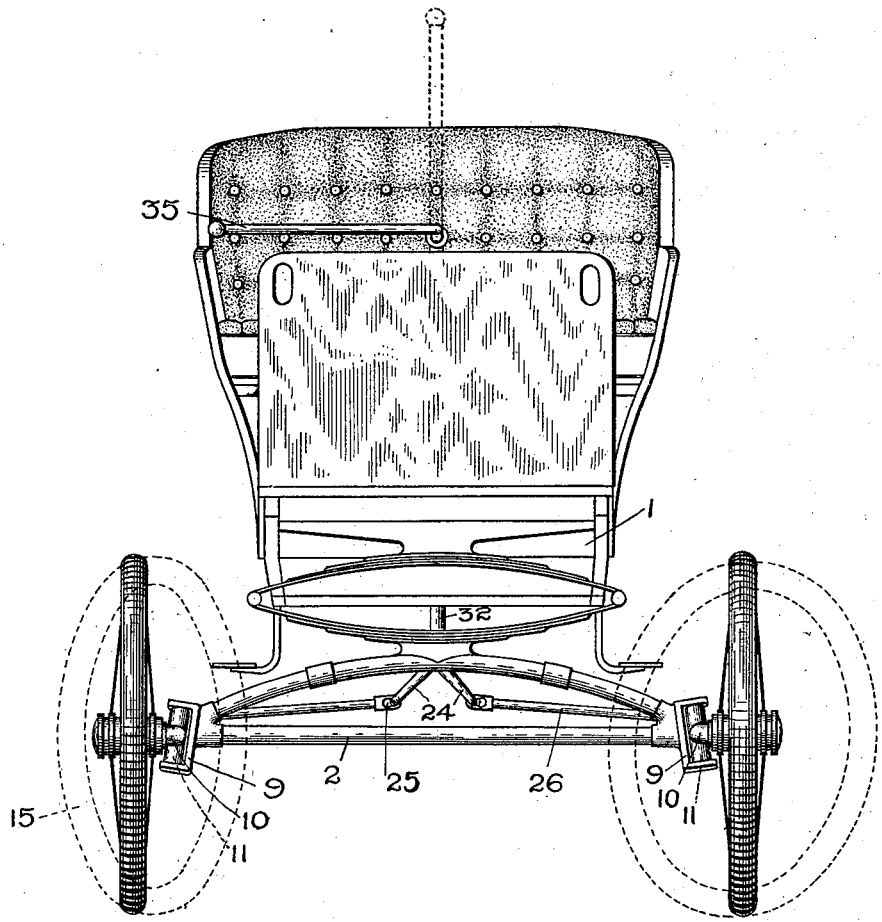

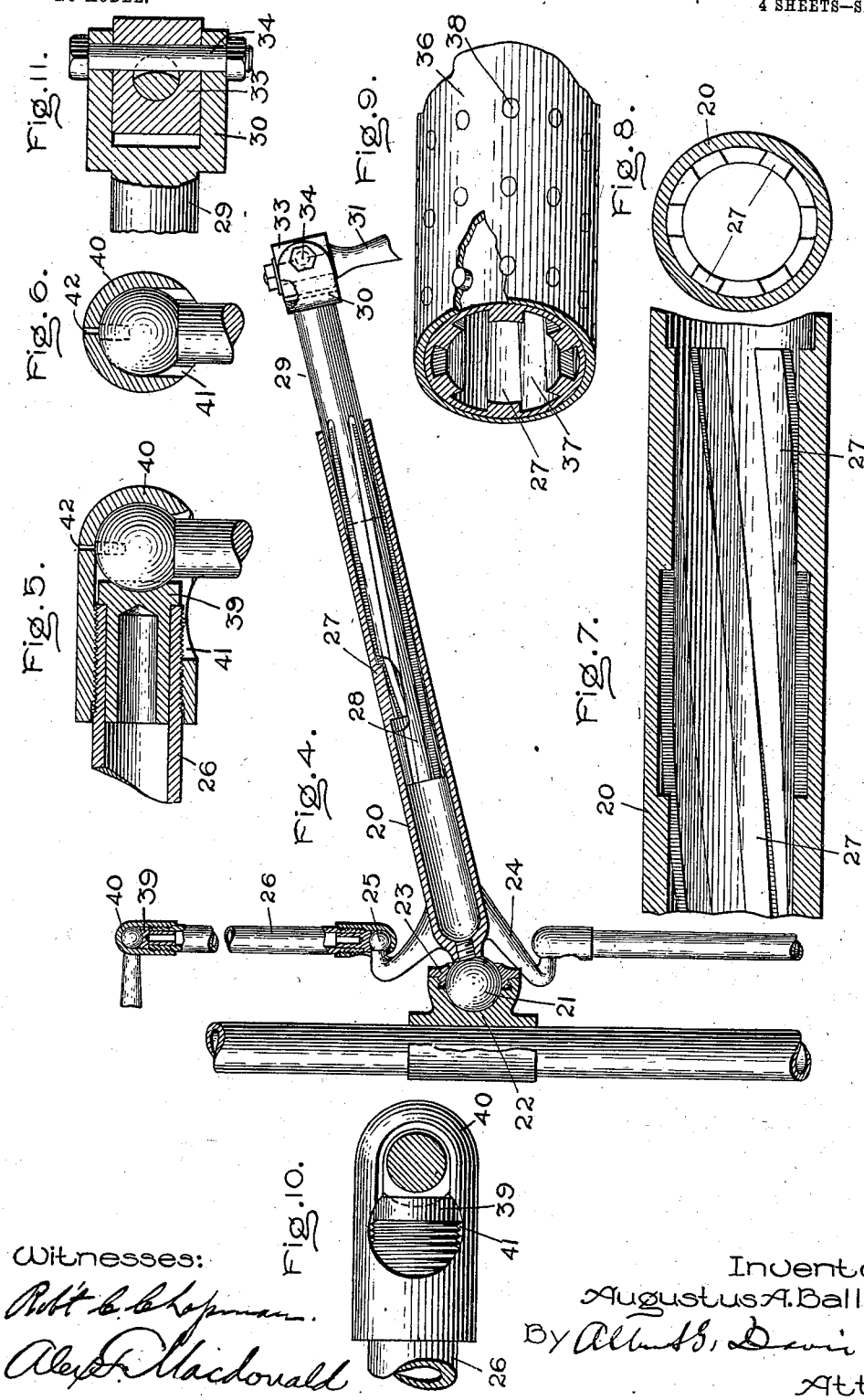

UNITED STATES PATENT OFFICE.

AUGUSTUS A. BALL, JR., OF LYNN, MASSACHUSETTS, ASSIGNOR TO ELIHU THOMSON, OF SWAMPSCOTT, MASSACHUSETTS.

STEERING MECHANISM FOR VEHICLES.

SPECIFICATION forming part of Letters Patent No. 723,975, dated March 31, 1903.

Application filed January 24, 1902. Serial No. 91,012. (No model.)

*To all whom it may concern:*

Be it known that I, AUGUSTUS A. BALL, Jr., a citizen of the United States, residing at Lynn, in the county of Essex, State of Massachusetts, have invented certain new and useful Improvements in Steering Mechanisms for Vehicles, of which the following is a specification.

For self-propelled vehicles the double-axle suspension for the steering-wheels has been universally adopted, owing chiefly to the fact that the points of support are so distributed as to reduce to a minimum the tendency of the vehicle to upset. In order to give the steering-wheels a certain self-steering tendency, the pivots for the short axles have been inclined backward slightly in a manner similar to the forks and head of a bicycle. They have also been given a slight lateral inclination for the same reason. Such constructions present certain disadvantages. When the wheels are deflected from the straight path of travel, they move the vehicle-body as a whole laterally. They also raise the vehicle-body more or less, depending upon the inclination of the pivots. A further objection is due to the sliding action to which the tires are subjected when moved about the pivots. The latter action is due chiefly to the pivots being separated by a less distance than the contact-points of the steering-wheels. The actions above referred to are plainly noticeable when the vehicle is standing idle and the steering-wheels are deflected by the steering-handle. The raising of the vehicle-body during the act of steering means that an unnecessary effort is required to steer the vehicle, while the lateral movement causes a swaying of the vehicle, which is dangerous, particularly at high speeds, and many serious accidents have been largely due to this cause. I have discovered that these objectionable features may be overcome by giving the pivots for the short axles certain angular inclinations and locating them back of a plane passing through said axles, and this without sacrificing any of the advantages of the inclined-pivot arrangement.

My invention further has for its object to provide means for preventing the transmission of strains due to road thrusts to the hand of the operator.

The scope of my invention will be more fully set forth in the description and in the claims appended thereto.

In the accompanying drawings, which represent an embodiment of my invention, Figure 1 is a side elevation of a vehicle. Fig. 2 is a plan view of the vehicle-frame. Fig. 3 is a front elevation of the vehicle. Fig. 4 is a sectional view, partially in plan, of the steering-check. Fig. 5 is a sectional detail of the connection employed to connect the steering-rods with the short axles. Fig. 6 is a cross-section of the connector shown in Fig. 5. Fig. 7 is a longitudinal section of the screw-threaded sleeve or nut employed to actuate the steering-wheels. Fig. 8 is a cross-section of the sleeve or nut shown in Fig. 7. Fig. 9 is a perspective view illustrating a slight modification in the construction of the sleeve or nut. Fig. 10 is a bottom plan view of the connection shown in Figs. 5 and 6. Fig. 11 is a cross-section of the joint between the screw and the steering-lever, and Figs. 12 and 13 are diagrammatic views illustrating the path of movement of the steering-wheels.

In the drawings, 1 represents the vehicle-body, which is supported from the front axle by an elliptical spring extending parallel with the axle and at the rear end by two elliptic springs extending at right angles to the rear axle. To the front axle 2 is rigidly secured a U-shaped frame 3, Fig. 2, the latter being pivotally secured to the rear axle 4. Rigidly secured to the rear axle is a triangular frame 5, the latter being secured to the vehicle-body through the medium of the ball-and-socket joint 6. The rear axle is provided with differential gearing, which is mounted in the casing 7, the gearing being driven by the engine 8. The frame is so constructed that when the body rises and falls under the action of the springs it is caused to move slightly forward or back, thereby compensating for changes in position of the steering mechanism, as will appear hereinafter.

Mounted on the ends of the front axle or support 2 are yokes 9, in which the short axles 10 are pivotally secured by the spindles 11.

The short axles are made in the form of bell-crank levers, and the opening in each lever for receiving the spindle is placed back of a plane passing through the centers of the short axles. Such a plane is indicated by the broken and dotted line 12, Fig. 2. The pivots or spindles are inclined backward, as is clearly indicated in Fig. 1, and are also inclined laterally, as is indicated in Fig. 3. The pivots are inclined backward by such an amount that a line passing down through the center of the spindle will strike the ground in line with the points of wheel contact. In other words, each spindle 11 is set back of the plane represented by the broken and dotted line 12 and inclined by an amount which will permit the center line of each spindle when extended to strike the ground at a point in close proximity to that of the wheel contact. To put the matter in a still different way, the spindle is placed back of the wheel-contact point by an amount equal to the sine of the angle of inclination of the pivot. Each wheel in moving around under the action of the steering lever or mechanism describes as its path the frustum of an inverted cone, the axis of which is inclined backward and also laterally.

In Figs. 12 and 13 I have shown diagrammatically the path that each wheel travels when swung around its spindle 11 as a center. The line 13 14 represents the side of a cone and is at right angles to the base plane. This also represents the plane or position of the wheel as viewed from the front. Assuming that the wheel is now moved to the dotted-line position 15, (indicated in Figs. 2 and 3,) the position of the wheel is still vertical, because the side of the cone represented by the line 16 17 is at right angles to the base or ground. On the other hand, the second steering-wheel has assumed a somewhat rearwardly-inclined position, because it is traveling in the path of an inverted cone, the side of which at that particular point is inclined to the base or ground plane. In other words, during a portion of the steering movement of each wheel it is maintained in a vertical plane, owing to the relation of the pivots, while during the remainder of the movement it is inclined for the same reason.

The arrangement of the pivots is such that the vehicle-body is not raised during the act of steering, neither is it shifted laterally. The wheels in turning around on the pivots 11 are so set that they will roll, and there is no tendency of the wheels to slide or grind on the ground, which is so detrimental to tires. Such an arrangement also makes it easier for the operator, owing to the decreased effort required to turn the wheels.

With twenty-eight-inch steering-wheels the spindles 11 can with advantage be inclined about eight or nine degrees, the backward and lateral inclination being preferably equal. With larger wheels the angles made by the pivots may be somewhat less. The parts are also preferably so arranged that the projected centers will not meet under the wheels—in other words, at the wheel contacts—for such an arrangement will cause the wheels to spin instead of roll during the act of steering.

Referring to Fig. 2, it will be seen that the wheel which turns under the vehicle-body in the act of steering is turned in such a manner that it acts as a brace against thrusts or strains in the direction of travel. This is important, in that it reduces the tendency of the wheel to buckle when turned suddenly. The wheel that turns under the body is arranged to make a greater angle than the outer wheel, so as to turn the vehicle more quickly than would be the case where both wheels are arranged to move through equal angles. This throws more strain on the under wheel, which, as before stated, is braced against it, and the danger from accident, due to buckling, is reduced.

In order to steer the vehicle and at the same time prevent the transmission of wheel strains to the hand of the operator, a special steering mechanism is employed consisting of two principal parts. One of said parts comprises an elongated nut or sleeve having spiral grooves or threads cut therein similar to a rifle-barrel, which is pivotally supported on the stationary axle and is connected to the steering-wheels, the other of said parts comprising a threaded bar or rod which is pivotally connected to the steering-handle and is fitted into the sleeve or nut in such manner that a longitudinal movement of the bar will cause a rotary movement of the sleeve or nut, and hence cause the wheels to be deflected. In other words, I have provided a device for transforming the rectilinear movement of the rod into a rotary movement for the purpose of moving the steering-wheels.

Referring to Figs. 2 and 4, 20 represents the threaded or grooved sleeve, which is provided with a ball 21, that enters the socket 22 and is confined therein by a nut 23. The socket is rigidly mounted on the front axle in any suitable manner. Formed on or otherwise rigidly secured to the sleeve 20 is a pair of arms or forks 24, each of which is provided at its end with a ball 25 for making connection with the steering rods or tubes 26. The interior of the actuating-sleeve 20 is provided with spiral grooves or threads 27, the angle of incline of which is less than the angle of friction, the latter being from fifteen to twenty degrees, depending upon the kind of metal. The threads in the sleeve need not extend the whole length thereof, as this would entail considerable expense, but may be limited in length, as shown in Fig. 4. The sleeve should be long enough to cover the corresponding threads 28 on the rod 29 at all times, so as to protect them from foreign substances. As shown, the part 29 forms the male member, while the part 20 forms the female member; but it is obvious that the arrangement may be reversed and the part 20 made the male member and part 29 the female member. On the end of the rod 29 is formed a fork 30, Figs. 4 and 11, which is arranged to receive the lever 31, carried by the steering-shaft 32. The lever 31 is provided on its end with a cylindrical extension to receive the block 33, the latter being retained on the lever by a nut and in the fork 30 by a vertically-extending bolt 34. The cylindrical extension of the lever 31 is cut away, as shown in Fig. 11, to permit the nut and rod 29 to rise and fall slightly under the actions of the vehicle. The lever 31 is shown as being placed on the right-hand side of the steering-shaft 32; but it can be placed on the other side, if desired.

The steering-shaft 32 is supported entirely by the vehicle-body, and therefore moves up and down with it under the action of the springs. Pivotally secured to the upper end of the shaft is a handle 35, having an offset therein, so as to give plenty of room for the operator. If the vehicle-body moved up and down under the action of the springs uninfluenced by the frame, there would be a slight movement of the rod 29 into and out of the sleeve or nut 20, resulting in limited deflections of the steering-wheels, depending upon the magnitude of said movement. This action is compensated for by means of the frame 5, which is rigidly secured to the rear axle and pivotally secured to the vehicle-body. When the body rises, it is moved backward slightly with respect to the axles, and when it is depressed it moves forward just enough to compensate for the changes in position. In considering this matter it should be borne in mind that the frame and steering rod and nut are more nearly in a straight line when the vehicle is loaded than when empty, as shown.

In Figs. 7 and 8 the sleeve is formed with integral threads. In Fig. 9 I have shown a slight modification, whereby the nut can be cheaply and quickly made. A perforated sleeve 36 is provided, and within said sleeve is a body of Babbitt metal 37, which is retained in place by the projections 38, that enter the perforations in the tube. In forming this sleeve the tube is placed in a suitable holding device, the threaded rod 29 or its equivalent mounted centrally therein, and the hot Babbitt metal is poured between them.

Referring now to the construction of the rods or tubes for connecting the actuating sleeve or nut with the short steering-axles, 26 represents the connecting-tube, which is threaded on both ends, both threads being cut in the same direction—that is to say, both right or both left hand—so that if one cap which is mounted thereon tends to work off the other is correspondingly tightened, thus compensating for it and maintaining a fixed distance between centers. Mounted in the end of the tube is a hard-steel thimble 39, having an enlarged head, the latter resting against the end of the tube. The thimble is straight-sided and makes a working fit with the tube and is provided with a slight cavity or depression to receive the ball 25 on the arm 24 or the ball on the end of the short axle. Screw-threaded to the outside of the tube is a cap 40, having a hardened inner surface which engages with the ball. This cap is provided with an opening 41, made like a buttonhole, one portion of which is large enough to receive the ball, while the other portion is of such size as will permit the same to have a certain freedom of motion. The cap is arranged to hold the thimble as well as the ball in place, thus reducing the number of parts to a minimum and decreasing the cost of manufacture. In order to mount the parts in place, the cap is slipped over the ball 25 and the tube 26 rotated until the same is seated. The other cap is then mounted on the tube and given a few turns, after which the ball on the short axle is mounted in place and the short axle and the cap rotated until the latter is seated, after which the spindle 11 can be inserted in the fork 9 and the wheel mounted on the axle. The caps should be mounted on the vehicle in such manner that the openings 41 face downward, so as to prevent foreign particles from getting into the joints. In order to oil the joints, a small oil-hole 42 is provided in each cap, and located in the ball opposite the opening is a small wick arranged to receive and hold oil.

In steering the vehicle the operator moves the handle forward or back from the position shown in Fig. 2, depending upon the direction it is desired to travel. The rod 29 being capable of longitudinal movement, but not of rotation, causes the sleeve 20 to rotate as it is moved, and the sleeve in turn transmits motion to the wheels through the steering rods or tubes 26.

What I claim as new, and desire to secure by Letters Patent of the United States, is—

1. In a vehicle, the combination of a stationary axle, steering-wheels, short axles therefor, and pivots for the short axles which are set back of a plane passing through said axles and are inclined backward and also laterally.

2. In a vehicle, the combination of a fixed support or axle, steering-wheels, bell-crank levers forming axles for the wheels, pivots for securing the bell-crank axles to the support, the said pivots being set back of a plane passing through the short axles and inclined backward and laterally, whereby the wheel which is moved forward stands upright while the wheel which is moved backward is inclined against the direction of motion of the vehicle.

3. In a vehicle, the combination of a stationary axle, a pair of bell-crank levers forming axles for the wheels, steering-wheels, pivots for securing the bell-crank lever-axles to the stationary axle, the said pivots being set back of a vertical plane passing through the wheel-axles and inclined backward and laterally, the angles of inclination being equal, whereby the steering-wheels when actuated will roll around and not lift or shift the stationary axle laterally, and levers for moving the wheels simultaneously.

4. In a vehicle, the combination of steering-levers, a stationary axle, bell-crank lever-axles for the steering-wheels, and pivots for securing the bell-crank lever-axles to the stationary axles, which are set back of a line passing through the centers of the axles and are also inclined backward and laterally in such a manner that the wheels when rolled around under the action of the steering-levers will describe an inverted frustum of a cone.

5. In a vehicle, the combination of a stationary axle, a grooved sleeve pivotally secured thereto, steering-wheels, levers connecting the sleeve with the wheels, a grooved rod, and means for moving the rod in a manner to rotate the sleeve and cause a movement of the steering-wheels.

6. In a vehicle, the combination of a stationary axle, a grooved sleeve, a universal joint for securing the sleeve to the axle, steering-wheels, levers rigidly connected to the sleeve and pivotally connected to the axles of the steering-wheels, a grooved rod which is fitted into the sleeve, and a lever for moving the rod into and out of the sleeve in a manner to produce rotation of the latter for the purpose of moving the steering-wheels.

7. In a vehicle, the combination of a stationary axle, a pair of short axles pivoted thereto and carrying the steering-wheels, a grooved sleeve having a pair of oppositely-disposed arms rigidly secured thereto, a grooved rod fitting into the sleeve, means for imparting a longitudinal movement to the rod for causing a partial rotation of the sleeve, rods connecting the arms with the short axles, and ball-joints between the rods and the arms.

8. In a vehicle, the combination of a stationary axle, a pair of short axles mounted thereon, means for transforming the rectilinear movement of an element into a rotary motion for the purpose of steering, a spring-supported body, a steering-lever mounted on the body for actuating said means, a rear axle, and a pivotal connection between the rear axle and the body whereby the movements of the body, under the action of the springs, are prevented from affecting the action of the steering means.

9. In a steering mechanism, the combination of a stationary axle, a pair of short axles pivotally secured thereto, a steering-lever, couplings secured thereto, and rods having similarly-cut threads at the ends thereof for uniting them with the couplings in such manner that when one coupling loosens, the other tightens and thus preserves a fixed distance between them.

10. In a steering mechanism, the combination of a stationary axle, a sleeve having a long spiral groove formed in the interior, a ball-and-socket support for the sleeve, a grooved rod which is fitted into the sleeve, a steering-shaft, a lever rigidly secured to the shaft and pivotally secured to the rod for imparting longitudinal movement to the rod, arms which are rigidly secured to the sleeve, short steering-axles, steering-rods, and ball-and-socket joints for uniting the axles and arms with the steering-rods.

11. In a steering mechanism, the combination of a perforated sleeve, a rod having a long spiral groove, and a body of Babbitt or like metal which fills the perforations in the sleeve and also forms the threads.

12. In a steering mechanism, the combination of a tube, a detachable piece mounted therein having a ball-cavity formed in the head, a cap which is screw-threaded to the tube and is provided with a buttonhole-opening, and a lever having a ball formed thereon, which ball can pass through one end of the opening when the cap is partially removed but is retained in place when the cap is seated.

13. In a steering mechanism, the combination of a tube having a screw-threaded end, a detachable piece having smooth sides and an enlarged head mounted in the end of the tube, a ball which is secured to a lever, and a screw-threaded cap mounted on the tube which retains the thimble and ball in place.

14. In a steering mechanism, the combination of a fixed support, a grooved sleeve which is pivotally secured thereto at one end and is free at the other, a grooved rod which is pivotally supported at one end in a manner to prevent rotation and enters the sleeve at the other, means for moving the rod longitudinally into and out of the sleeve for the purpose of imparting rotary movement thereto, steering-wheels, and means connecting the steering-wheels with the sleeve.

15. In a steering mechanism, the combination of a steering-shaft, a lever connected thereto, a cylindrical extension on the end of the lever having a cut-away portion, a steering-rod having a forked end, a block which is mounted in the fork and surrounds the cylindrical extension, and a bolt which passes through the block and the cut-away portion of the extension for securing them to the fork.

16. In a steering mechanism, the combination of a steering-rod, a lever having a ball secured to the end thereof, a wick placed in the ball, a connection which unites the rod and lever, and an oil-hole formed in the connection opposite the wick.

In witness whereof I have hereunto set my hand this 17th day of January, 1902.

AUGUSTUS A. BALL, JR.

Witnesses:
DUGALD McK. McKILLOP,
JOHN A. McMANUS.